United States Patent
Rork et al.

(10) Patent No.: US 9,766,874 B2
(45) Date of Patent: Sep. 19, 2017

(54) AUTONOMOUS GLOBAL SOFTWARE UPDATE

(71) Applicant: Ford Global Technologies, LLC, Dearborn, MI (US)

(72) Inventors: Joseph Paul Rork, Plymouth, MI (US); Brian Petersen, Beverly Hills, MI (US); Ritesh Pandya, Rochester Hills, MI (US); Praveen Yalavarty, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 14/151,526

(22) Filed: Jan. 9, 2014

(65) Prior Publication Data
US 2015/0193220 A1    Jul. 9, 2015

(51) Int. Cl.
*G06F 9/445* (2006.01)
*G06Q 10/00* (2012.01)

(52) U.S. Cl.
CPC ............... *G06F 8/65* (2013.01); *G06Q 10/20* (2013.01)

(58) Field of Classification Search
USPC .................................................. 717/189–178
See application file for complete search history.

(56) References Cited

U.S. PATENT DOCUMENTS

| | | | |
|---|---|---|---|
| 5,155,847 A | 10/1992 | Kirouac et al. | |
| 6,035,423 A * | 3/2000 | Hodges | G06F 8/65 709/219 |
| 6,263,360 B1 * | 7/2001 | Arnold | G06F 8/65 707/999.01 |
| 6,359,570 B1 | 3/2002 | Adcox et al. | |
| 6,694,248 B2 | 2/2004 | Smith et al. | |
| 6,704,564 B1 | 3/2004 | Lange et al. | |
| 6,853,910 B1 | 2/2005 | Oesterling et al. | |
| 7,055,149 B2 | 5/2006 | Birkholz et al. | |
| 7,092,803 B2 | 8/2006 | Kapolka et al. | |
| 7,155,321 B2 | 12/2006 | Bromley et al. | |
| 7,171,661 B1 * | 1/2007 | Pinera | G06F 8/65 709/202 |
| 7,209,859 B2 | 4/2007 | Zeif | |
| 7,366,589 B2 | 4/2008 | Habermas | |

(Continued)

OTHER PUBLICATIONS

A Model for Safe and Secure Execution of Downloaded Vehicle Applications, Phu H. Phung—Dept. of Computer Science and Engineering, Chalmers University of Technology, Sweden; Dennis Kengo Nilsson, Syncron, Japan; Road Transport Information and Control Conference and the ITS United Kingdom Members' Conference, May 25-27, 2010.

(Continued)

*Primary Examiner* — Jason Mitchell
(74) *Attorney, Agent, or Firm* — Jennifer M. Stec; Brooks Kushman P.C.

(57) ABSTRACT

A computer-implemented method may include subscribing to a first topic tree topic associated with an installed vehicle software component version; identifying a desired software component version based on a published notification retrieved from the first topic; and when the desired version and the installed version differ, updating a software component using a software update retrieved from a second topic tree topic associated with software updates to the installed version.

20 Claims, 5 Drawing Sheets

(56) References Cited

U.S. PATENT DOCUMENTS

| | | | |
|---|---|---|---|
| 7,506,309 B2 | 3/2009 | Schaefer | |
| 7,512,941 B2* | 3/2009 | Pan | G06F 17/30575 707/999.201 |
| 7,672,756 B2 | 3/2010 | Breed | |
| 7,822,775 B2 | 10/2010 | Langer | |
| 7,886,180 B2 | 2/2011 | Jin et al. | |
| 7,904,569 B1 | 3/2011 | Gelvin et al. | |
| 7,937,075 B2 | 5/2011 | Zellner | |
| 8,326,486 B2 | 12/2012 | Moinzadeh et al. | |
| 8,370,254 B1 | 2/2013 | Hopkins, III et al. | |
| 8,416,067 B2 | 4/2013 | Davidson et al. | |
| 8,427,979 B1 | 4/2013 | Wang | |
| 8,452,465 B1 | 5/2013 | Sinha et al. | |
| 8,458,315 B2 | 6/2013 | Miche et al. | |
| 8,473,938 B1 | 6/2013 | Feeser | |
| 8,494,449 B2 | 7/2013 | Witkowski et al. | |
| 8,498,771 B2 | 7/2013 | Dwan et al. | |
| 8,521,424 B2 | 8/2013 | Schunder et al. | |
| 8,561,054 B2 | 10/2013 | Smirnov et al. | |
| 8,918,231 B2 | 12/2014 | Rovik | |
| 9,075,686 B2 | 7/2015 | Alrabady et al. | |
| 9,201,844 B2 | 12/2015 | Guenkova-Luy et al. | |
| 2002/0120394 A1 | 8/2002 | Rayne | |
| 2002/0150050 A1 | 10/2002 | Nathanson | |
| 2002/0165962 A1* | 11/2002 | Alvarez | G06F 8/65 709/226 |
| 2004/0010358 A1 | 1/2004 | Oesterling et al. | |
| 2004/0034624 A1* | 2/2004 | Deh-Lee | H04L 67/26 |
| 2004/0064385 A1 | 4/2004 | Tamaki | |
| 2004/0117851 A1* | 6/2004 | Karaoguz | H04N 7/163 725/134 |
| 2004/0168169 A1* | 8/2004 | Ebro | G06F 9/4435 717/172 |
| 2004/0250060 A1 | 12/2004 | Diep et al. | |
| 2005/0010458 A1* | 1/2005 | Holloway | G06F 17/30575 707/609 |
| 2005/0055687 A1* | 3/2005 | Mayer | G06F 8/65 717/173 |
| 2005/0090941 A1 | 4/2005 | Stefan et al. | |
| 2005/0125261 A1 | 6/2005 | Adegan | |
| 2005/0144616 A1 | 6/2005 | Hammond et al. | |
| 2005/0149922 A1* | 7/2005 | Vincent | G06F 8/67 717/172 |
| 2005/0187668 A1* | 8/2005 | Baumgarte | G06F 8/60 701/1 |
| 2005/0187682 A1 | 8/2005 | Gault et al. | |
| 2005/0203673 A1 | 9/2005 | El-Hajj et al. | |
| 2005/0216902 A1 | 9/2005 | Schaefer | |
| 2005/0256614 A1 | 11/2005 | Habermas | |
| 2005/0262499 A1* | 11/2005 | Read | G06F 8/67 717/172 |
| 2006/0047381 A1 | 3/2006 | Nguyen | |
| 2006/0047415 A1 | 3/2006 | Groskreutz et al. | |
| 2006/0047666 A1* | 3/2006 | Bedi | G06F 17/3089 |
| 2006/0141997 A1 | 6/2006 | Amiens | |
| 2006/0142913 A1 | 6/2006 | Coffee | |
| 2006/0155439 A1 | 7/2006 | Slawinski et al. | |
| 2006/0258377 A1 | 11/2006 | Economos et al. | |
| 2007/0055414 A1 | 3/2007 | Darji | |
| 2008/0082548 A1 | 4/2008 | Betts | |
| 2008/0102854 A1 | 5/2008 | Yi et al. | |
| 2008/0133337 A1 | 6/2008 | Fletcher et al. | |
| 2008/0140278 A1 | 6/2008 | Breed | |
| 2008/0208972 A1 | 8/2008 | Chou et al. | |
| 2008/0301670 A1* | 12/2008 | Gouge | G06F 17/30867 717/173 |
| 2009/0064123 A1 | 3/2009 | Ramesh et al. | |
| 2009/0088141 A1 | 4/2009 | Suurmeyer et al. | |
| 2009/0088924 A1 | 4/2009 | Coffee | |
| 2009/0119657 A1 | 5/2009 | Link, II | |
| 2009/0125897 A1 | 5/2009 | Matlin et al. | |
| 2009/0182825 A1 | 7/2009 | Fletcher | |
| 2010/0082559 A1 | 4/2010 | Sumcad et al. | |
| 2010/0228404 A1* | 9/2010 | Link, II | G06F 9/44542 701/1 |
| 2010/0235433 A1* | 9/2010 | Ansari | G06Q 30/04 709/203 |
| 2010/0241722 A1 | 9/2010 | Seminaro et al. | |
| 2011/0045842 A1* | 2/2011 | Rork | H04L 12/5865 455/456.1 |
| 2011/0083128 A1 | 4/2011 | Hoch et al. | |
| 2011/0099232 A1 | 4/2011 | Gupta et al. | |
| 2011/0105029 A1 | 5/2011 | Takayashiki et al. | |
| 2011/0106375 A1 | 5/2011 | Gurusamy Sundaram | |
| 2011/0112969 A1 | 5/2011 | Zaid et al. | |
| 2011/0137490 A1 | 6/2011 | Bosch et al. | |
| 2011/0258268 A1 | 10/2011 | Banks et al. | |
| 2011/0306329 A1 | 12/2011 | Das | |
| 2011/0307933 A1* | 12/2011 | Gavita | H04N 21/25858 725/112 |
| 2012/0079149 A1 | 3/2012 | Gelvin et al. | |
| 2012/0094643 A1 | 4/2012 | Brisebois et al. | |
| 2012/0142367 A1 | 6/2012 | Przybylski | |
| 2012/0245786 A1 | 9/2012 | Fedorchuk et al. | |
| 2012/0253861 A1 | 10/2012 | Davidson | |
| 2012/0330723 A1 | 12/2012 | Hedy | |
| 2013/0031540 A1 | 1/2013 | Throop et al. | |
| 2013/0130665 A1 | 5/2013 | Peirce et al. | |
| 2013/0204455 A1 | 8/2013 | Chia et al. | |
| 2013/0204466 A1 | 8/2013 | Ricci | |
| 2013/0226393 A1 | 8/2013 | Julson et al. | |
| 2014/0066047 A1* | 3/2014 | Qiang | H04W 8/22 455/419 |
| 2014/0100737 A1 | 4/2014 | Haap et al. | |
| 2014/0222282 A1 | 8/2014 | Pauli | |
| 2014/0282467 A1 | 9/2014 | Mueller | |
| 2014/0282470 A1 | 9/2014 | Buga et al. | |
| 2014/0324275 A1 | 10/2014 | Stanek et al. | |
| 2014/0380296 A1 | 12/2014 | Pal et al. | |
| 2015/0003456 A1 | 1/2015 | Seo et al. | |
| 2015/0046080 A1 | 2/2015 | Wesselius et al. | |
| 2015/0058946 A1 | 2/2015 | Salamon et al. | |
| 2015/0128123 A1 | 5/2015 | Eling | |
| 2015/0169311 A1 | 6/2015 | Dickerson et al. | |
| 2015/0309784 A1 | 10/2015 | Molin | |

OTHER PUBLICATIONS

Vehicle Telematics: A Literature Review, Ian Cassias, Andrew L. Kun, Technical Report ECE.P54.2007.9, Oct. 30, 2007.

* cited by examiner

Fig-5

AUTONOMOUS GLOBAL SOFTWARE UPDATE

TECHNICAL FIELD

The illustrative embodiments generally relate to a method and apparatus for performing software updates.

BACKGROUND

To update a software version of a component of a vehicle, the vehicle may be driven to a dealership and serviced by a technician. The technician may utilize a system that tracks the individual software levels of every component in the vehicle as well as available software updates. The technician may manually apply the software updates indicated by the system and record any changes back into the system.

SUMMARY

In a first illustrative embodiment, a computer-implemented method includes subscribing to a first topic tree topic associated with an installed vehicle software component version and identifying a desired software component version based on a notification published in the topic. The method further includes, when the desired version and the installed version differ, updating a software component using a software update in a second topic tree topic, associated with an updated version of the installed version.

In a second illustrative embodiment, a vehicle includes a vehicle-based computing system configured to subscribe to a first topic tree topic associated with an installed vehicle software component version and identify a desired software component version based on a published notification retrieved from the first topic. The vehicle-based computing system is further configured to, when the desired version and the installed version differ, update a software component using a software update retrieved from a second topic tree topic associated with software updates to the installed version In a third illustrative embodiment, a non-transitory computer readable storage medium stores instructions that, when executed by a processor, configure the processor to subscribe to a first topic tree topic associated with an installed vehicle software component version, and identify a desired software component version based on a published notification retrieved from the first topic. The computer readable storage medium further stores instructions that, when executed by a processor, configure the processor to, when the desired version and the installed version differ, update a software component using a software update retrieved from a second topic tree topic associated with software updates to the installed version.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A vehicle software update system may utilize a publish/subscribe model to publish software updates that can be consumed by vehicle subscribers. The publish/subscribe model may utilize topics, also known as logical channels, through which publishers may send messages and subscribers may receive messages. In some cases, a vehicle may be a publisher and may send vehicle alerts to a service delivery network, respond to commands from the service delivery network, or notify the service delivery network of vehicle connectivity status. In other cases, a vehicle may be a subscriber and may receive control messages or software updates from a service delivery network.

A topic tree structure may be utilized by the vehicle software update system to define a structure of the topics and sub-topics that are used in sending messages between the vehicles and the service delivery network. A vehicle-based computing system (VCS), such as a telematics unit of a vehicle, may subscribe to nodes of the topic tree that correspond to the installed software/firmware version of the vehicle.

A publisher of software updates (e.g., without limitation, a remote original equipment manufacturer (OEM) server, etc.) may provide a notification message in a topic node corresponding to a vehicle to be updated or a version of the software to be updated. The publisher may further publish a software upgrade in a topic node associated with a version of the software to be updated by the software upgrade. In some examples, the notification message may include or take the form of a global configuration file specifying a desired software version for which the global configuration file is applicable. The vehicle may retrieve the message and determine whether to upgrade its software version to the version specified by the notification. For example, if the desired software version is newer than the installed software version of the vehicle, the vehicle may target to update to the desired software version. To perform the update, the vehicle may subscribe to the topic node corresponding to its installed software version, and install the software update published to that topic node. Thus, to update VCSs of a particular software version, a publisher of software updates may provide a software update, and publish a configuration file in a topic of the particular software version to be updated.

Figure 1:
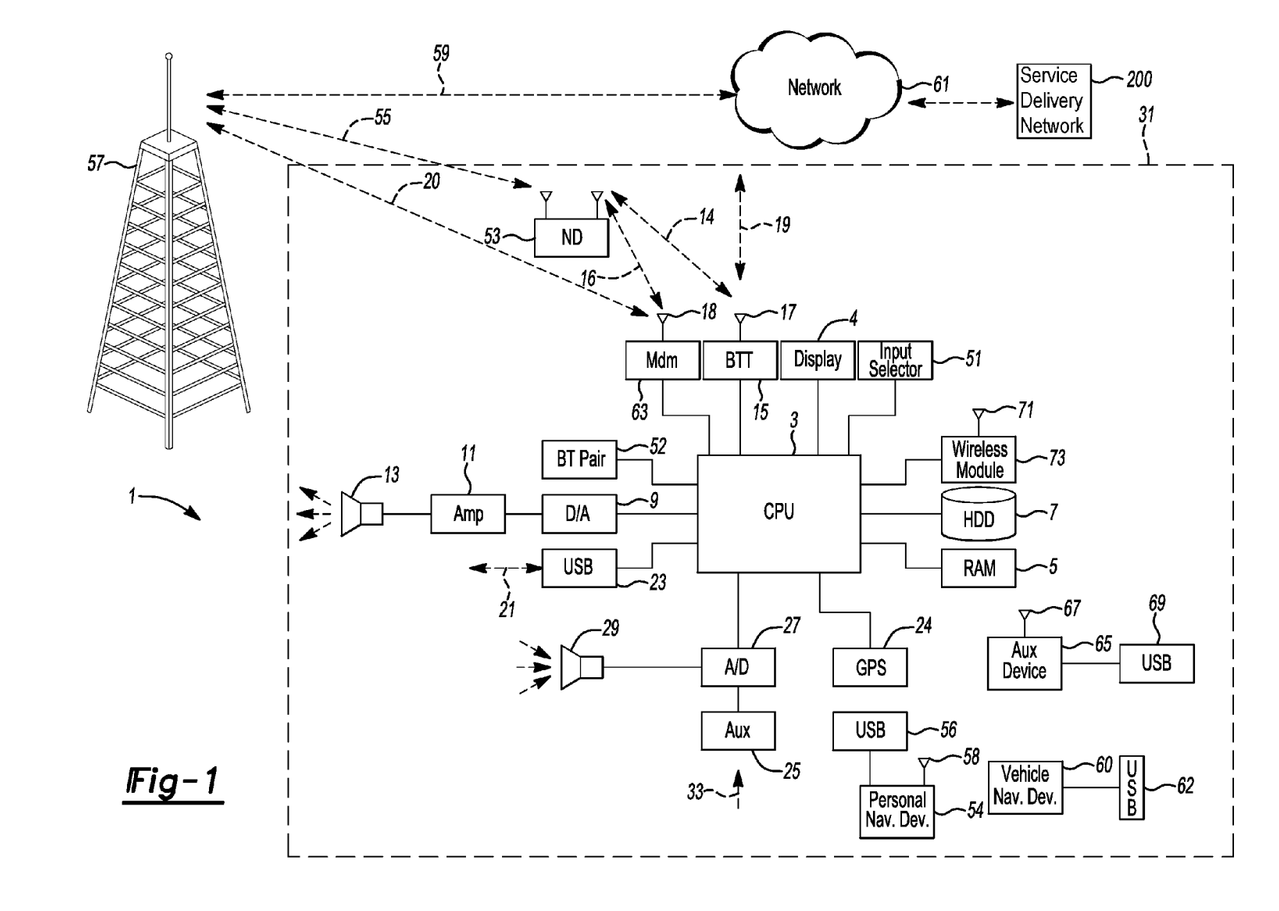
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, HDDs, compact disks (CDs), digital versatile disks (DVDs), magnetic tapes, solid state drives, portable universal serial bus (USB) drives and any other suitable form of persistent storage 7.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, a screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor 3. Although not shown, numerous of the vehicle components and auxiliary components in communication with the VCS 1 may use a vehicle network (such as, but not limited to, a car area network (CAN) bus) to pass data to and from the VCS 1 (or components thereof).

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a nomadic device (ND) 53 (e.g., cell phone, smart phone, PDA, or any other device having wireless remote network connectivity). The nomadic device 53 can then be used to communicate 59 with a network 61 outside the vehicle 31 through, for example, communication 55 with a cellular tower 57. In some embodiments, tower 57 may be a WiFi access point.

Exemplary communication between the nomadic device 53 and the BLUETOOTH transceiver is represented by communication 14.

Pairing a nomadic device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a nomadic device 53.

Data may be communicated between CPU 3 and network 61 utilizing, for example, a data-plan, data over voice, or dual-tone multiple frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the Institute of Electrical and Electronics Engineers (IEEE) 802 personal area network (PAN) protocols. IEEE 802 local area network (LAN) protocols include wireless fidelity (WiFi) and have considerable cross-functionality with IEEE 802 PAN. Both are suitable for wireless communication within a vehicle 31. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle 31. 3G standards are now being replaced by IMT-Advanced (4G) which offers 200 mbs for users in a vehicle 31 and 1 gbs for stationary users. If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless LAN device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless 67 or wired 69 connection. Auxiliary device 65 may include, but are not limited to, personal media players, wireless health devices, portable computers, and the like.

Also, or alternatively, the CPU 3 could be connected to a vehicle-based wireless router 73, using for example a WiFi (IEEE 803.11) 71 transceiver. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 itself is capable of performing the exemplary processes.

Figure 2:
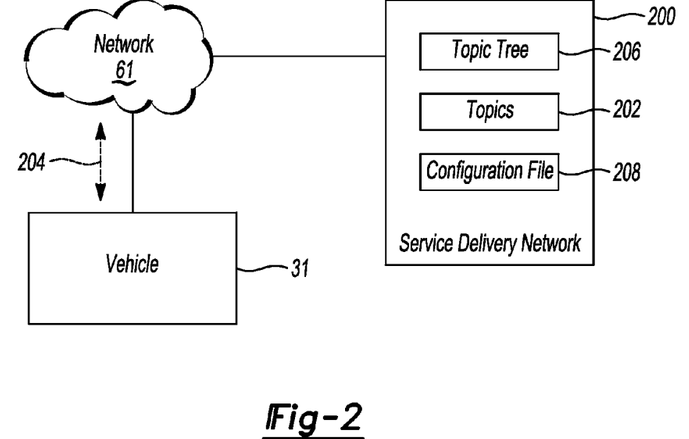
FIG. 2 illustrates an exemplary global update system in communication with a vehicle-based computing system.

FIG. 2 illustrates an exemplary service delivery network 200 in communication over the network 61 with a vehicle 31, through a wireless device, in wireless communication with the network and the vehicle. When a vehicle 31 is assembled, the vehicle 31 may include various hardware and software components. Upon or after assembly, a VCS 1 of the vehicle 31 may be configured to query for existence and version information for at least a portion of these hardware and software components of the vehicle 31. Using the queried information and additional information identifying the specific vehicle 31 (e.g., VIN information published on the CAN bus, subscriber identity module (SIM) information of the modem 63 such as international mobile station equipment identity (IMEI), etc.), the VCS 1 may communicate via the network 61 to establish an account with the service delivery network 200. The service delivery network 200 may receive these communications from the vehicles 31, and may maintain a data store of the hardware configurations and software (e.g., firmware, etc.) versions linked to identifiers of the vehicles 31.

The service delivery network 200 may additionally provide publish/subscribe messaging functionality for communication between the service delivery network 200 and the vehicles 31. The publish/subscribe model may utilize one or more topics 202, where topics 202 are named logical channels through which publishers may send messages 204 and subscribers may receive messages 204. Rather than receiving all the messages 204, subscribers to the topics 202 receive the messages 204 published to the topics 202 to which they subscribe, and all subscribers to a topic 202 will receive substantially the same topic messages 204. A publisher of the messages 204 may be responsible for providing messages 204 to the topics 202 that are consistent with the topic 202. The publisher may include, for example, an OEM or other entity responsible for maintaining and/or updating vehicle software/firmware.

In some cases, a vehicle 31 may be a publisher and may send vehicle alerts to a topic 202 of the service delivery network 200, respond to messages 204 from the service delivery network 200, or notify the service delivery network 200 of vehicle 31 connectivity status to the network 61. In other cases, a vehicle 31 may be a subscriber and may receive control messages 204 or other information from a service delivery network 200.

To facilitate the publishing of messages 204 to appropriate topics 202, the topics 202 may be arranged into a topic tree 206. The topic tree 206 may be defined by the service delivery network 200 to provide a structure of the topics 202 and sub-topics 202 that are used in sending messages 204 between the vehicles 31 and the service delivery network 200.

Figure 3:
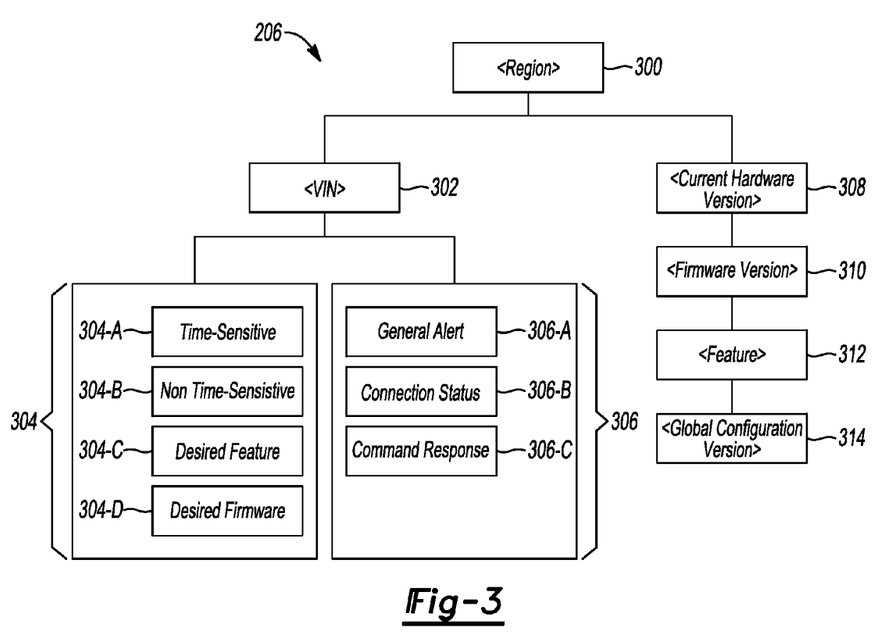
FIG. 3 illustrates an exemplary topic tree for software versions of a vehicle-based computing system.

FIG. 3 illustrates an exemplary topic tree 206 for use in updating software versions of a VCS 1. The topic tree 206 may be used, for example, to allow the service delivery network 200 to define a topic 202 structure for performing vehicle 31 software updates. A VCS 1, such as a telematics unit of a vehicle 31, may subscribe to nodes of the topic tree 206 that correspond to the installed region, software/firmware version, features, configuration file version of the vehicle 31, etc. It should be noted that the particular layout of the exemplary topic tree 206 is for purpose of illustration only, and other layouts of topic tree 206 may be used. For example, other topic trees 206 may be used by the service delivery network 200 that have more, fewer or different levels of categorization.

Referring to the topic tree 206 of FIG. 3, a region node 300 of the topic tree 206 may indicate a region for which the sub-topic 202 nodes under the region node 300 may relate. In some cases, the region nodes 300 may represent different regional market areas in which vehicles 31 may be sold, such as North America, Europe, and Asia Pacific. In other examples the region nodes 300 may relate to other geographical areas, such as countries, states, postal codes, and telephone area codes, as some other examples. By segmenting the topic tree 206 by region, the service delivery network 200 may accordingly publish different information for vehicles 31 associated with different regions.

Under each region node 300, the topic tree 206 may include one or more vehicle-specific nodes 302, where each vehicle-specific node 302 relates to a vehicle 31 associated with the parent regional node 300. As one possibility, the service delivery network 200 may create vehicle-specific nodes 302 for vehicles 31 according to VIN or other unique identifier of vehicles 31 that register with the service delivery network 200 as belonging to the particular region. Sub-nodes to the vehicle-specific nodes 302 may be used to further organize topics 202 configured for communication to and from the individual vehicles 31.

For instance, under the vehicle-specific nodes 302, the topic tree 206 may further include one or more vehicle topic nodes 304 for communication to the specific vehicles 31. A vehicle 31 may subscribe to the vehicle topic node 304 that correspond to the VIN or other unique identifier of the vehicle 31, so that the vehicle 31 may be able to receive messages 204 in topics 202 that specifically relate to the vehicle 31 itself.

As one example, a vehicle 31 may subscribe to a time-sensitive update vehicle topic node 304-A for receiving messages 204 for the particular vehicle 31 that are of a time-sensitive nature. Due to their time-sensitive nature, messages 204 posted to the time-sensitive update vehicle topic node 304-A may time out and be removed from the topic 202 if they are not received by the vehicle 31 within an amount of time (e.g., specified by the message 204, common to all time-sensitive messages 204, etc.). As another example, a vehicle 31 may subscribe to a non-time-sensitive vehicle topic node 304-B for receiving messages 204 for the particular vehicle 31 that not of a time-sensitive nature.

Updates, such as calendar updates, may be posted to the non-time-sensitive vehicle topic node 304-B, and may remain in the topic 202 until received by the subscribed vehicle 31. As a further example, a vehicle 31 may subscribe to a feature update vehicle topic node 304-C for receiving messages 204 in a topic 202 directed to particular vehicles 31 and relating to updates to the features 31 of the vehicle 31. In this content, a feature may refer to a grouping of configuration parameters applicable to the specified vehicle 31 included in the topic tree 206. A feature may, for example, represent settings to implement an available connected service (e.g., MY FORD MOBILE) or a customer-specific collection of settings (e.g., a suite of features requested to be enabled and/or disabled for use by a particular fleet purchaser). As yet a further example, a vehicle 31 may subscribe to a firmware update vehicle topic node 304-D for receiving messages 204 in a topic 202 directed to particular vehicles 31 and relating to updates to the firmware of the vehicle 31.

The vehicle-specific nodes 302 the topic tree 206 may further include one or more vehicle topic nodes 306 for communication from the specific vehicles 31. For example, a general alert topic node 306-A may be used by a vehicle 31 to publish messages 204 such as indications of low fuel, erratic driving by the vehicle 31, or periodic current vehicle 31 GPS locations. As another example, a connection status topic node 306-B may be used by a vehicle 31 to publish messages 204 such as the connection status of the vehicle 31 (e.g., whether the vehicle 31 was disconnected and then reconnected to the network 61). As yet a further example, a command response alert topic node 306-C may be used by a vehicle 31 to publish messages 204 such as indications of success or failure of actions requested by the service delivery network 200.

Moreover, under each region node 300 the topic tree 206 may include one or more hardware version topic nodes 308, where each hardware version topic node 308 relates to a installed vehicle 31 hardware version that may be shared by multiple vehicles 31 (e.g., a version of the VCS 1 hardware). These hardware version topic nodes 308 and sub-topic nodes may accordingly be used to reference the vehicles 31 according to hardware version, not according to individual vehicle 31.

Under each hardware version topic node 308, the topic tree 206 may include one or more firmware version nodes 310. Each firmware version node 310 may organize nodes of the topic tree 206 associated with a firmware version that may be installed on the parent vehicle 31 hardware for a particular region.

The firmware version node 310 may further include feature nodes 312 organizing nodes of the topic tree 206 associated with a particular feature. As mentioned above, a feature may represent settings to implement an available connected service or a customer-specific collection of settings. Thus, a firmware version may support multiple different features, where different portions of functionality of the firmware are engaged or disengaged for the various features.

The feature nodes 312 may further include configuration version nodes 314, each representing a topic 202 related to a version of a configuration file for the associated feature, firmware version, hardware version, and region. The configuration files may include setting and other information related to the parent features that they configure (e.g., for the version of firmware installed on the version of hardware for the particular region). Because settings and other options may change from version to version, the configuration files may also include a version number of the firmware for which they are compatible.

A vehicle 31 may subscribe to topics of 202 the topic tree 206 that relate to the configuration of the vehicle 31. As one example, a vehicle may subscribe to a vehicle topic node 304 corresponding to the VIN of the vehicle 31, to receive any updates targeting the specific vehicle 31. As another example, a VCS 1 of a vehicle 31 may subscribe to a configuration version node 314 of the topic tree 206, to receive configuration or other updates corresponding to the installed region, hardware version, firmware version, feature, and global configuration version of the vehicle 31. The subscribed vehicle 31 may check or otherwise be informed of messages 204 published to the subscribed topics 202.

The service delivery network 200 may publish messages 204 into topics 202 of the topic tree 206 for which updates are to be performed. As one possibility, the service delivery network 200 may publish a message 204 into a vehicle topic node 304 to cause a particular vehicle 31 to be informed that an update should be performed for the vehicle 31. As another possibility, the service delivery network 200 may publish a message 204 into a configuration version node 314 to cause any subscribed vehicles 31 having a particular region, hardware version, firmware version, feature, and global configuration version to perform an update.

In some examples, an update may be indicated by a service delivery network 200 publishing a new configuration file in the subscribed topic 202 as the message 204, where the new configuration file may be associated with an updated version of the software or firmware. A vehicle 31 receiving the configuration file may identify the version of the configuration file, and may set a desired software or firmware version for the vehicle 31 to be that of the version of the configuration file. Thus, upon becoming aware of an update notification message 204 in a subscribed node of the topic tree 206, the vehicle 31 may identify to upgrade its software version to the version specified by the notification.

The vehicle 31 may further utilize the topic tree 206 to provide updates messages 204 to the service delivery network 200 with respect to the status of the software update. For example, the vehicle 31 may publish alert messages 204 in an alert vehicle topic node 304 indicative of whether or not the software update was successful, and also to report the new installed version of the vehicle 31 software to the service delivery network 200. Accordingly, by using the topic tree 206, the service delivery network 200 may be able to request updates for individual vehicles 31 or for vehicles 31 having specific configurations.

A software application may be updated from an older version to a newer version by updating those parts that have changed from the previous version, rather than by uninstalling the old version and installing the new version. These incremental updates may be referred to as deltas or differentials. An incremental update may be applied to update a software module or application from one version to a next version. In some cases, software may be multiple versions behind, and may require iterative updating from the old installed version to the current version through the ordered application of multiple incremental updates. The incremental approach may have certain advantages over full updates, such as reduced network traffic for downloaded version updates, as well as ease of testing of version upgrades from the previous version as compared to testing from all earlier versions of the software. Either approach may be used as is appropriate for a given situation.

Figure 4A:
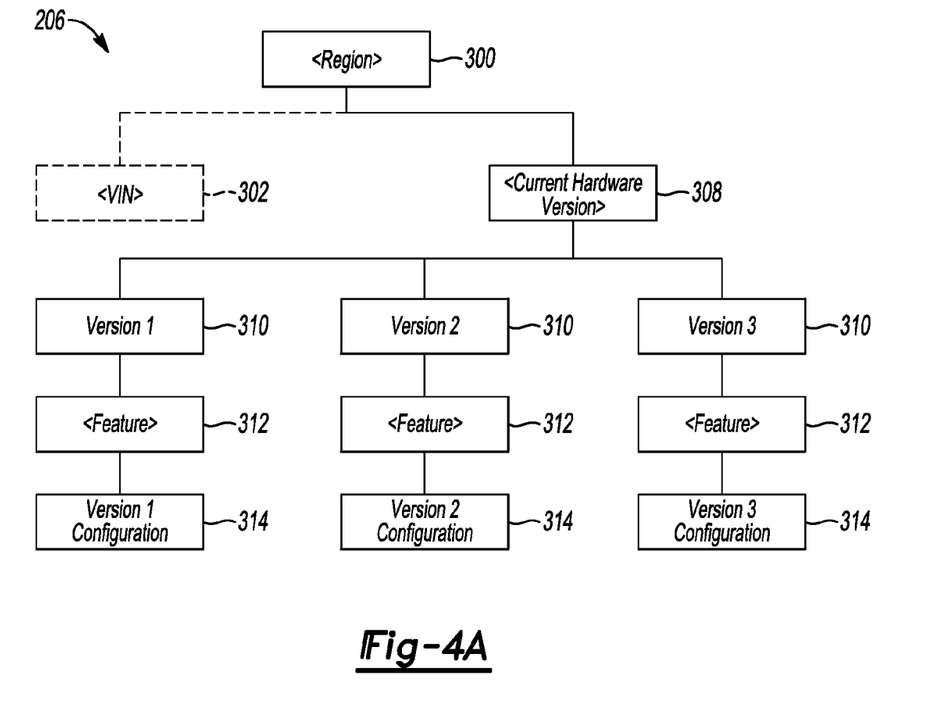
FIG. 4A illustrates an exemplary topic tree for a software component of a vehicle 31 in which multiple versions are installed in the field.

FIG. 4A illustrates an exemplary topic tree 206 for a software component of a vehicle 31 in which multiple versions are installed in the field. For instance, a software module may have some vehicles 31 in the field at version 1, others at version 2, and still others at version 3. A bug or other issue may be identified that affects software versions 1 and 2, but not version 3. A new version of the software, version 4, may be created to correct the issue in versions 1 and 2 (and potentially correct any issues that may have been causes by the issue). As vehicles 31 having software at version 3 are unaffected, it may be undesirable for those vehicles 31 to download and update to version 4. However, using an incremental update approach, vehicles 31 at versions 1 and 2 may be required to be updated through version 3 in order to reach version 4.

Figure 4B:
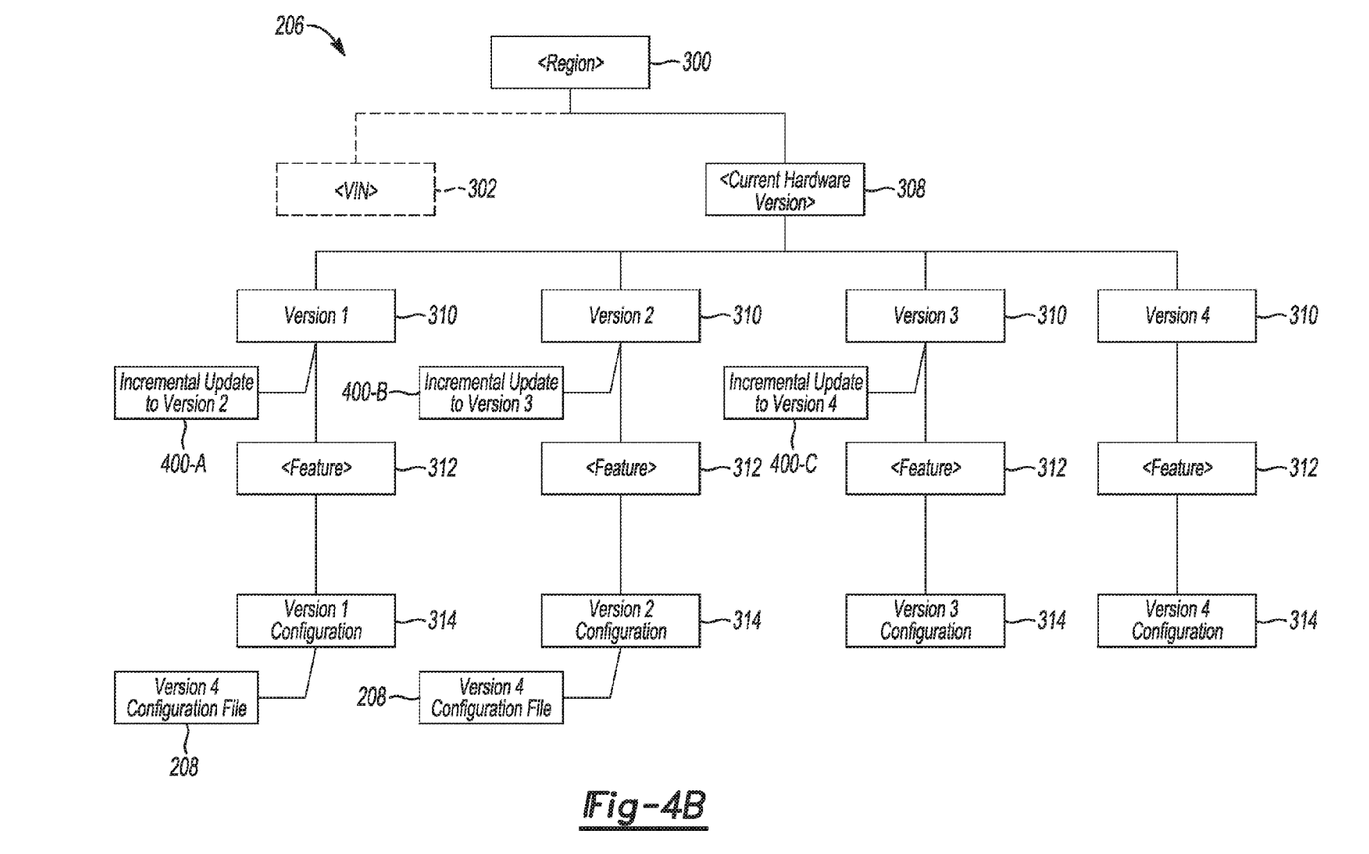
FIG. 4B illustrates an exemplary topic tree for incrementally updating versions of a software component of a vehicle.

FIG. 4B illustrates an exemplary topic tree 206 for incrementally updating versions of a software component of a vehicle 31. The service delivery network 200 may utilize the topic tree 206 to update the vehicles at version 1 and 2 to version 4, while not updating those vehicles 31 at version 3.

For example, the service delivery network 200 may publish update notifications to the configuration version node 314 topics 202 for vehicles 31 having versions 1 and 2 installed, but not to the configuration version node 314 topics for 202 vehicles 31 having version 3 installed. The update notifications may include configuration files 208 associated with version 4 of the software, such that the vehicles 31 at versions 1 and 2 receiving the notifications may set a desired software or firmware version for the vehicle 31 to be version 4. The service delivery network 200 may further publish incremental software updates 400 to the firmware version nodes 310. For example, the service delivery network 200 may publish an incremental software update 400-A from version 1 to version 2 in the firmware version node 310 for version 1, an incremental software update 400-B from version 2 to version 3 in the firmware version node 310 for version 2, and an incremental software update 400-C from version 3 to version 4 in the firmware version node 310 for version 3.

As the vehicles 31 at version 3 do not receive configuration files 208 associated with version 4, the vehicles 31 at version 3 do not set their desired version to 4. Accordingly, even though a software update from version 3 to version 4 is published, the vehicles 31 originally at version 3 in this example will not attempt to update to version 4.

A vehicle 31 at version 1 receiving the notifications may identify that the desired software version (i.e., version 4) and the installed software version (i.e., version 1) differ. When this occurs, the vehicle 31 may subscribe to the firmware version node 310 topic 202 of the topic tree 206 corresponding to the region and installed firmware version of the vehicle 31 (i.e., version 1). The vehicle 31 subscribed to the firmware version node 310 for version 1 may receive the published notification of the incremental software update 400-A from version 1 to version 2, and may download and install the incremental update 400-A. Upon successful installation, the vehicle 31 may now be at version 2 of the software. As the vehicle is now at version 2, the vehicle 31 may unsubscribe from the configuration version node 314 of the topic tree 206 related to version 1 and the firmware version node 310 for version 1, and may subscribe to the configuration version node 314 of the topic tree 206 related to version 2.

The vehicle 31 that is now at version 2 (or another vehicle 31 that in the example was initially at version 2) may identify that the desired software version (i.e., version 4) and the installed software version (i.e., version 2) continue to differ. When this occurs, the vehicle 31 may subscribe to the firmware version node 310 topic 202 of the topic tree 206 corresponding to the region and installed firmware version of the vehicle 31 (i.e., version 2). The vehicle 31 may accordingly receive the published notification of the incremental software update 400-B from version 2 to version 3, and may download and install the incremental update 400-B. Upon successful installation, the vehicle 31 may now be at version 3 of the software. As the vehicle is now at version 3, the vehicle 31 may unsubscribe from the configuration version node 314 of the topic tree 206 related to version 2 and the firmware version node 310 for version 2, and may subscribe to the configuration version node 314 of the topic tree 206 related to version 3.

The vehicle 31 that is now at version 3 may identify that the desired software version (i.e., version 4) and the installed software version (i.e., version 3) continue to differ. When this occurs, the vehicle 31 may subscribe to the firmware version node 310 topic 202 of the topic tree 206 corresponding to the region and installed firmware version of the vehicle 31 (i.e., version 3). The vehicle 31 may accordingly receive the published notification of the incremental software update 400-B from version 3 to version 4, and may download and install the incremental update 400-C. Upon successful installation, the vehicle 31 may now be at version 4 of the software. As the vehicle is now at version 4, the vehicle 31 may unsubscribe from the configuration version node 314 of the topic tree 206 related to version 3 and the firmware version node 310 for version 3, and may subscribe to the configuration version node 314 of the topic tree 206 related to version 4.

As the desired software version and the installed software version now match, the vehicle 31 is now updated. In some cases, the VCS 1 may be further configured to provide publish a message 204 to a command response alert topic node 306-C of the vehicle 31 to alert the service delivery network 200 of success of the software update.

The vehicles 31 originally at version 3 may identify that the desired software version (i.e., version 3) and the installed software version (i.e., version 3) are the same, and may elect not to perform any software updating. However, if at a later time the vehicles 31 at version 3 do receive an updated configuration file requesting an update to version 4 or later, the vehicles 31 may subscribe to the firmware version node 310 topic 202 of the topic tree 206 corresponding to the region and installed firmware version of the vehicle 31 (i.e., version 3), and may install the update.

Figure 5:
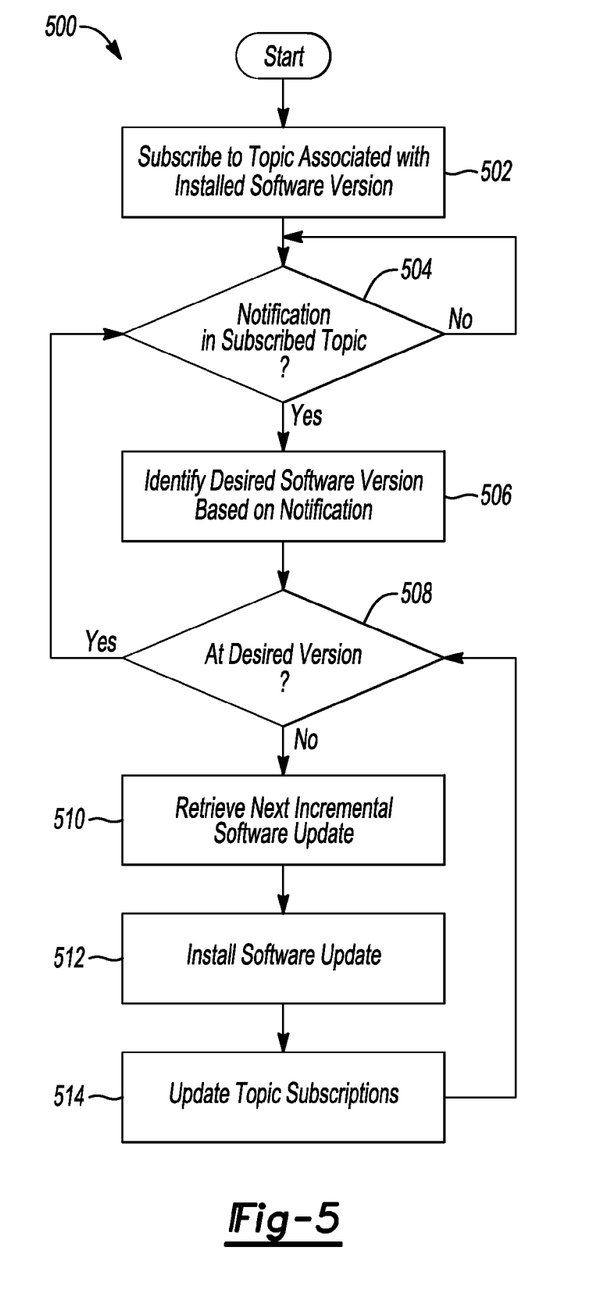
FIG. 5 illustrates an exemplary process for updating a software version of a component of the vehicle-based computing system.

FIG. 5 illustrates an exemplary process 500 for updating a software version of a component of the VCS 1. The process 500 may be performed, for example, by a VCS 1 of a vehicle 31 in communication with a service delivery network 200 over a network 61.

At block 502, the VCS 1 subscribes to a topic 202 of a topic tree 206 associated with a software version of a component of the vehicles 31. For example, for a firmware component of the vehicle 31, the VCS 1 may subscribe to a configuration version node 314 representing a topic 202 of the topic tree 206 served by the service delivery network 200 and related to the installed version, features, and region of the firmware component of the vehicle 31.

At decision point 504, the VCS 1 determines whether a notification message 204 is received in the subscribed topic 202. For example, the service delivery network 200 may publish a notification message 204 in the configuration version node 314, and the vehicle 31 may be notified of or may otherwise receive the notification message 204. If a notification message 204 is received, control passes to block 506. Otherwise, control remains at decision point 504.

At block 506, the VCS 1 identifies a desired software version for the software component based on the notification message 204. For example, the notification message 204 may be or may include a new configuration file, where the new configuration file may be associated with an updated version of the software or firmware. The configuration file may include a version number of the firmware or other version indication for which the file is compatible. A vehicle 31 receiving the configuration file may identify the version of the configuration file, and may set a desired software version for the vehicle 31 to be that of the version of the configuration file.

At decision point 508, the VCS 1 determines whether the desired software version and the installed software version differ. For example, the VCS 1 may determine whether the version of the configuration file is greater than the installed version of the firmware. If so, control passes to block 510 to perform a software update. If not, then a software update is not required and control passes to decision point 504. If the version of the configuration file is less than that of the installed version, then the VCS 1 may discard the configuration file, optionally provide an error back to the service delivery network 200, and may either pass control to decision point 504 or terminate the process 500.

At block 510, the VCS 1 retrieves a next incremental software update. For example, the vehicle 31 may subscribe to the firmware version node 310 topic 202 of the topic tree 206 corresponding to the installed firmware version of the vehicle 31. The service delivery network 200 may publish a software update to the firmware version node 310, and the subscribed vehicle 31 may download the software update.

At block 512, the VCS 1 installs the software update. For example, the VCS 1 may execute or otherwise apply the firmware update to the installed firmware version to update the firmware version. In some cases, the VCS 1 may be further configured to provide publish a message 204 to a command response alert topic node 306-C of the vehicle 31 to alert the service delivery network 200 of success or failure of the software update. Upon receiving a message 204 indicating success of the software update, the service delivery network 200 may update its records of the installed configuration status of the vehicle 31. As another possibility, if the software update fails, the VCS 1 may publish a failure message 204 to the command response alert topic node 306-C, and the process 500 may end, or possibly pass control to block 510 to retry the download and installation.

At block 514, the VCS 1 updates the topic 202 subscriptions of the vehicle 31. For example, the VCS 1 may cause the vehicle 31 to unsubscribe from the configuration version node 314 of the topic tree 206 and the firmware version node 310 for the old version, and to subscribe to the configuration version node 314 of the topic tree 206 related to the new installed version of the firmware. After block 514, control passes to decision point 508.

Thus, a service delivery network 200 may utilize a topic tree 206 to selectively provide updates to vehicles 31 according to installed software version, such as firmware version of a module of the vehicle 31, or a software version of an application installed on the VCS 1, without affecting the vehicle 31 installations of software versions on vehicles 31 of different versions. Moreover, these updates may be provided incrementally and automatically over-the-air to the vehicles 31, without incurring manufacturer or dealer technician costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   subscribing to a configuration subtopic of a version topic of a topic tree, the version topic corresponding to an installed vehicle software component version;
   identifying a desired software component version based on a published notification retrieved from the configuration subtopic; and
   when the desired version and the installed version differ, updating a software component using an incremental software update to a next version retrieved from the version topic.

2. The method of claim 1, further comprising:
   unsubscribing from the configuration subtopic; and
   subscribing to a second configuration subtopic of a second version topic of the topic tree, the second version topic corresponding to the next version of the software component after application of the software update.

3. The method of claim 1, further comprising subscribing to the version topic of the topic tree upon determining that the desired version and the installed version differ in order to retrieve the incremental software update.

4. The method of claim 3, further comprising unsubscribing from the version topic of the topic tree upon successful updating of the software component to the next version using the incremental software update.

5. The method of claim 1, further comprising ignoring a software update published to the version topic of the topic tree until receiving the notification of the desired version in the configuration subtopic.

6. The method of claim 1, wherein the published notification in the configuration subtopic includes a configuration file, and further comprising determining the desired version according to a version level of the software with which the configuration file is compatible.

7. The method of claim 6, further comprising identifying the version level of the software with which the configuration file is compatible according to a version indication included in the configuration file.

8. A vehicle, comprising:
a vehicle-based computing system including a processor programmed to:
subscribe to a configuration subtopic of a version topic of a topic tree, the version topic corresponding to an installed vehicle software component version;
identify a desired software component version based on a published notification retrieved from the configuration subtopic; and
when the desired version and the installed version differ, update a software component using an incremental software update to a next version retrieved from the version topic.

9. The vehicle of claim 8, wherein the vehicle-based computing system is further configured to:
unsubscribe from the configuration subtopic; and
subscribe to a second configuration subtopic corresponding to the next version of the software component after application of the software update.

10. The vehicle of claim 8, wherein the vehicle-based computing system is further configured to subscribe to the version topic of the topic tree upon determining that the desired version and the installed version differ in order to retrieve the incremental software update.

11. The vehicle of claim 10, wherein the vehicle-based computing system is further configured to unsubscribe from the version topic of the topic tree upon successful updating of the software component to the next version using the incremental software update.

12. The vehicle of claim 8, wherein the vehicle-based computing system is further configured to ignore a software update published to the version topic of the topic tree until receiving the notification of the desired version in the configuration subtopic.

13. The vehicle of claim 8, wherein the published notification in the configuration subtopic includes a configuration file, and wherein the vehicle-based computing system is further configured to determine the desired version according to a version level of the software with which the configuration file is compatible.

14. The vehicle of claim 13, wherein the vehicle-based computing system is further configured to identify the version level of the software with which the configuration file is compatible according to a version indication included in the configuration file.

15. A non-transitory computer readable storage medium, storing instructions that, when executed by a processor, configure the processor to:
subscribe to a configuration subtopic of a version topic of a topic tree, the version topic corresponding to an installed vehicle software component version;
identify a desired software component version based on a published notification retrieved from the configuration subtopic; and
when the desired version and the installed version differ, update a software component using an incremental software update to a next version retrieved from the version topic.

16. The computer readable storage medium of claim 15 additionally storing instructions to configure the processor to:
unsubscribe from the configuration subtopic; and
subscribe to a second configuration subtopic of a second version topic of the topic tree, the second version topic corresponding to the next version of the software component after application of the software update.

17. The computer readable storage medium of claim 15 additionally storing instructions to configure the processor to subscribe to the version topic of the topic tree upon determining that the desired version and the installed version differ in order to retrieve the incremental software update.

18. The computer readable storage medium of claim 17 additionally storing instructions to configure the processor to unsubscribe from the version topic of the topic tree upon successful updating of the software component to the next version using the incremental software update.

19. The computer readable storage medium of claim 15 additionally storing instructions to configure the processor to ignore a software update published to the version topic of the topic tree until receiving the notification of the desired version in the configuration subtopic.

20. The computer readable storage medium of claim 15, wherein the published notification in the configuration subtopic includes a configuration file, and additionally storing instructions to configure the processor to determine the desired version according to a version level of the software with which the configuration file is compatible.

* * * * *